Figure 1:
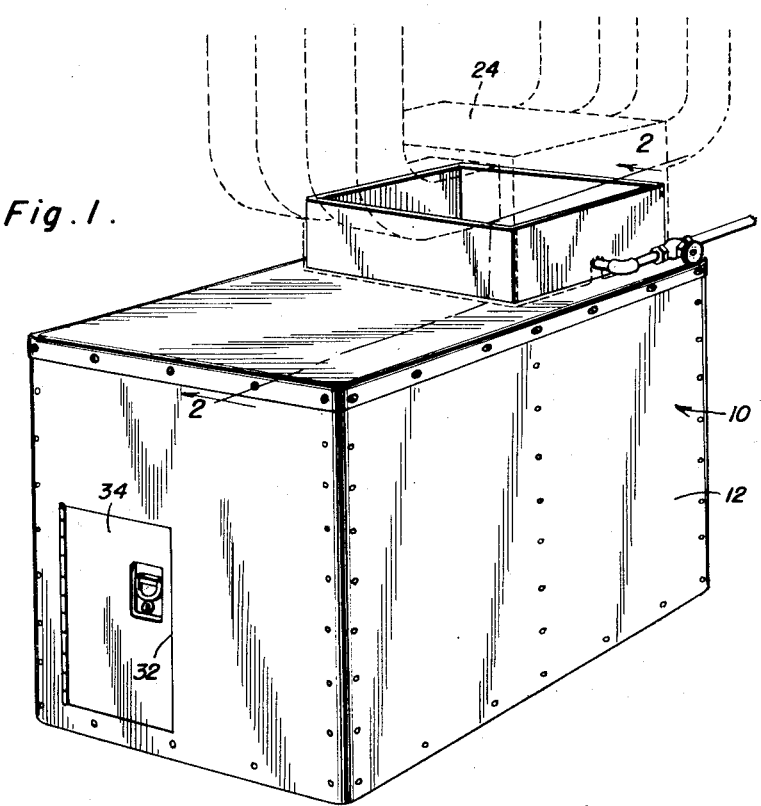

Oct. 2, 1951  F. M. FLYNN  2,569,809
HEATING METHOD AND APPARATUS

Filed May 3, 1948  6 Sheets-Sheet 1

Frank M. Flynn
INVENTOR.

BY *[signature]*
Attorneys

Frank M. Flynn
INVENTOR.

Oct. 2, 1951 — F. M. FLYNN — 2,569,809
HEATING METHOD AND APPARATUS
Filed May 3, 1948 — 6 Sheets-Sheet 3
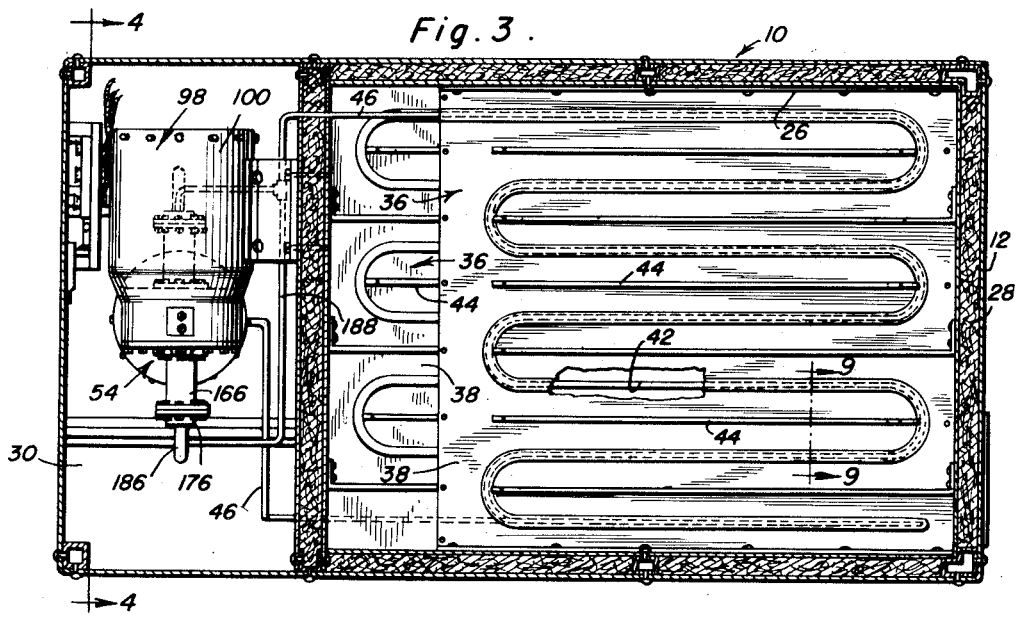
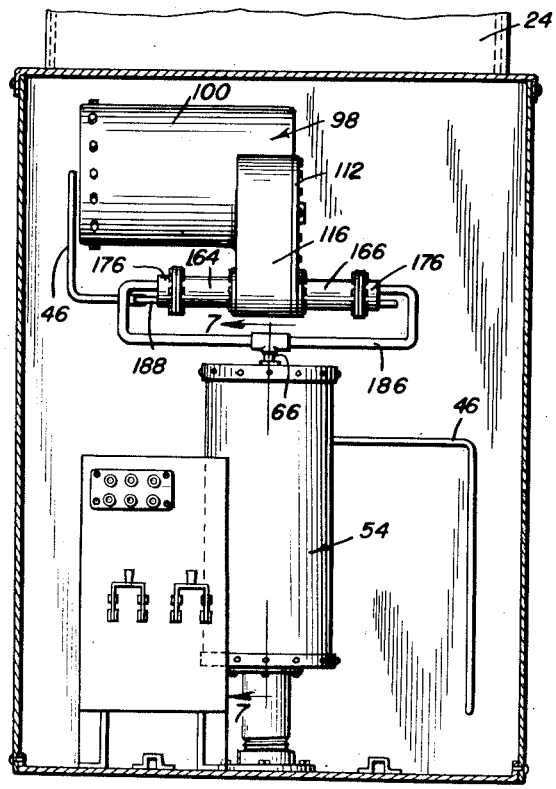
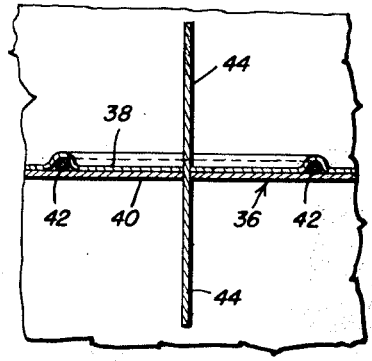
Frank M. Flynn
INVENTOR.

Oct. 2, 1951  F. M. FLYNN  2,569,809
HEATING METHOD AND APPARATUS
Filed May 3, 1948  6 Sheets-Sheet 4

Frank M. Flynn
INVENTOR.

Oct. 2, 1951 — F. M. FLYNN — 2,569,809
HEATING METHOD AND APPARATUS
Filed May 3, 1948 — 6 Sheets-Sheet 5

Frank M. Flynn
INVENTOR.

Oct. 2, 1951     F. M. FLYNN     2,569,809
HEATING METHOD AND APPARATUS

Filed May 3, 1948     6 Sheets-Sheet 6

Frank M. Flynn
INVENTOR.

BY
Attorneys

Patented Oct. 2, 1951

2,569,809

UNITED STATES PATENT OFFICE 2,569,809

HEATING METHOD AND APPARATUS

Frank M. Flynn, Binghamton, N. Y.

Application May 3, 1948, Serial No. 24,851

7 Claims. (Cl. 219—39)

This invention relates to a heating method and apparatus and has for its primary object to provide safe, clean and economical heating for domestic and other uses.

Another object is to avoid the production of soot, ashes and the like, which is commonly experienced when employing the combustion of fuel for the generation of heat.

Still another object is effectively and economically to convert electrical energy into heat, and to absorb the heat so generated in a suitable heat absorbing and conveying medium, such as atmospheric air.

The above and other objects may be attained by employing this invention which embodies among its features while maintaining it at a relatively low pressure, heating a relatively large volume of compressible gas or a mixture of compressible gas and water to a relatively high temperature, compressing the gas or mixture so heated to a relatively high pressure, while maintaining said gas or mixture at the relatively high pressure absorbing heat therefrom in a heat conveying medium, while subjecting the gas or the mixture to heat, reducing the pressure of the gas or the mixture from which heat has been absorbed and repeating the cycle.

Other features include heating the gas to a temperature of not less than 700° C., compressing the heated gas to a pressure of about 80 lbs. per square inch, while the gas is so compressed absorbing heat therefrom in a heat conveying medium and while subjecting the gas to heat reducing the pressure of the gas from which heat has been absorbed to substantially zero pressure and re-heating it and repeating the cycle.

Still other features include means for heating a relatively large volume of compressible gas or a mixture of compressible gas and water to a relatively high temperature, a compressor connected to the heating means for compressing the gas or mixture so heated, a heat exchange unit connected to the compressor into which the heated and compressed gas or mixture is delivered from the compressor, means for circulating a heat absorbing and conveying medium about the heat exchange unit to absorb heat from the gas or mixture and deliver it to a remote point, and means connected to the heat exchange unit and to the heating means for delivering the gas or mixture from which heat has been absorbed in the heat exchange unit to the heating means at a relatively low pressure.

Figure 10:
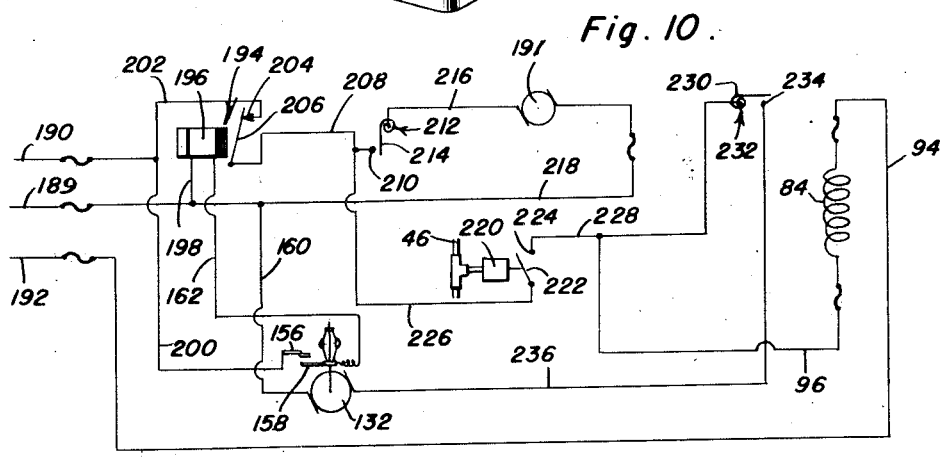
Figure 2:
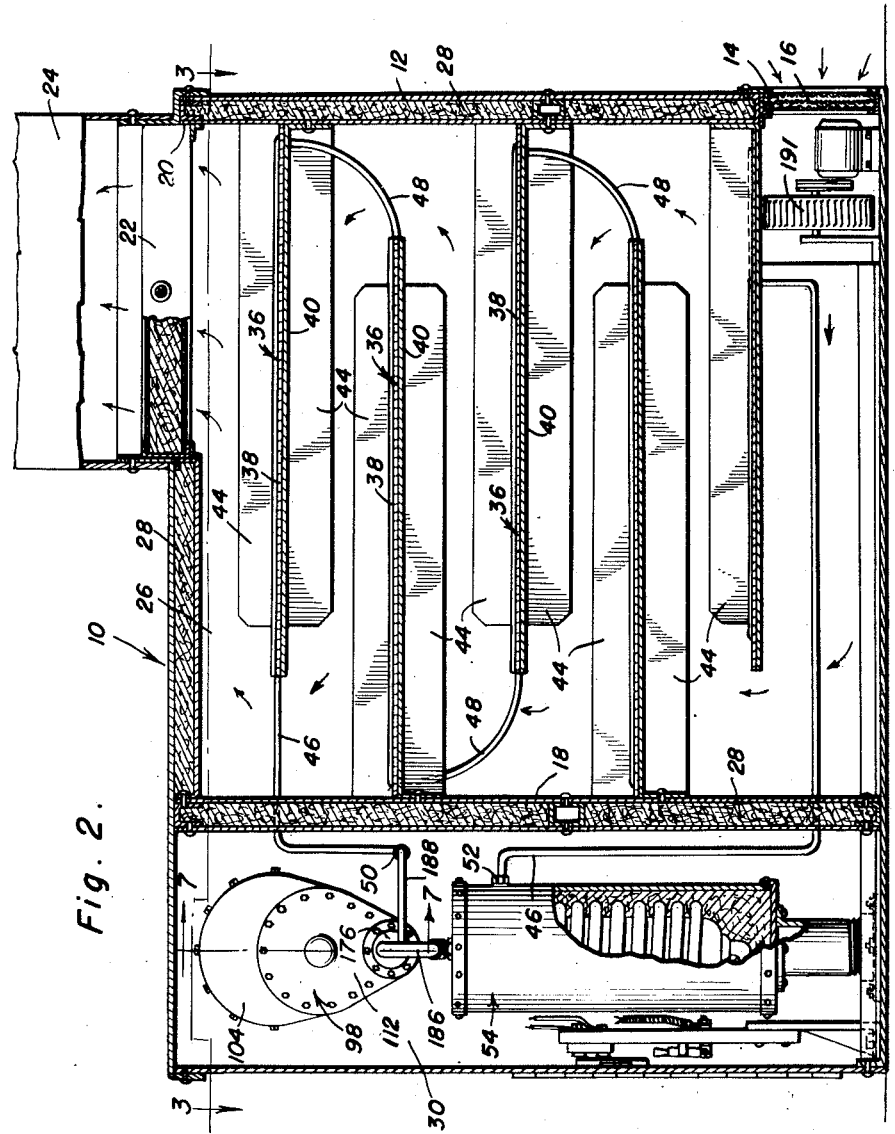
Figure 5:
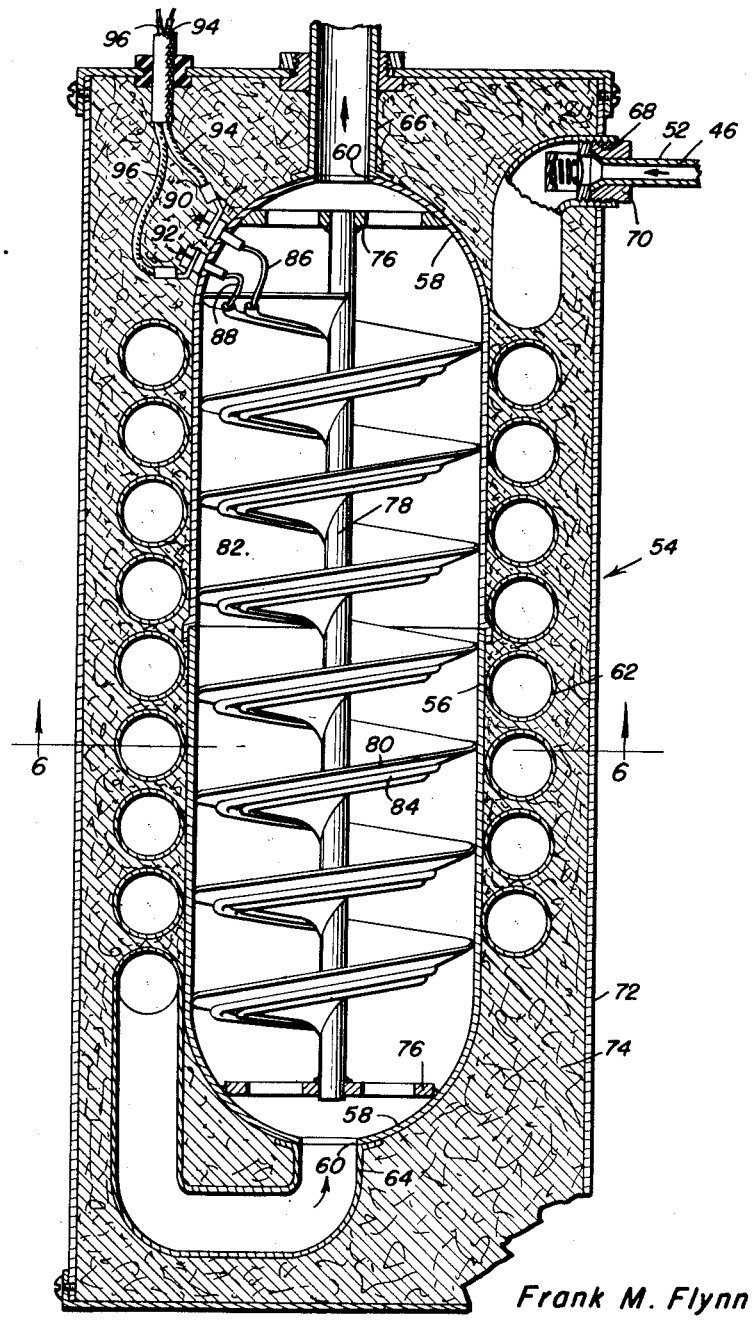
Figure 6:
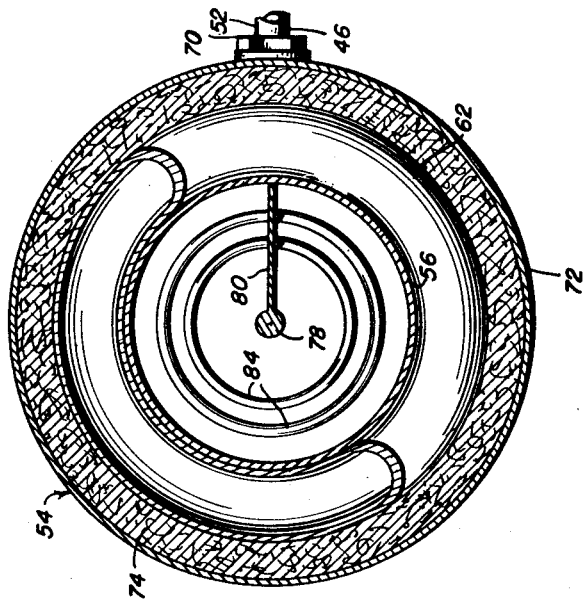
Figure 8:
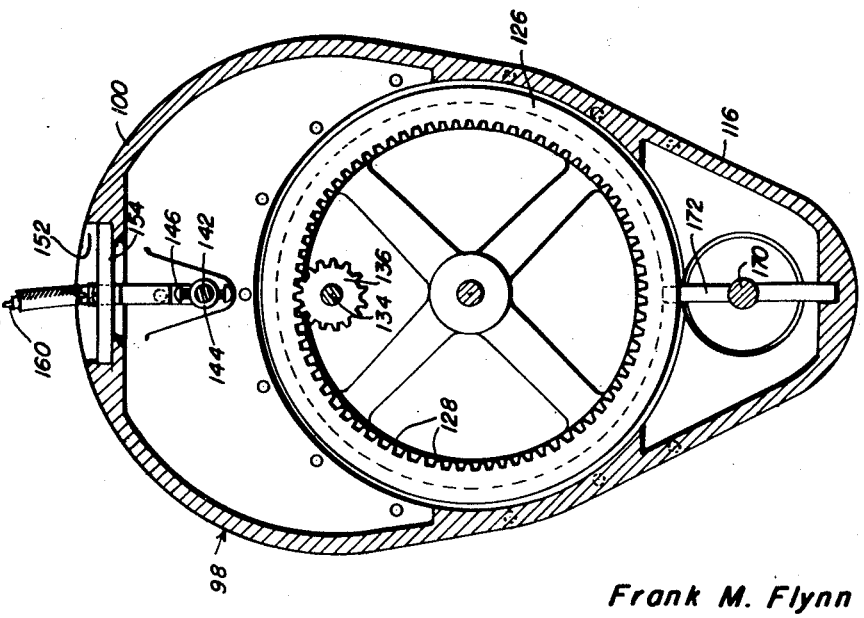
Figure 7:
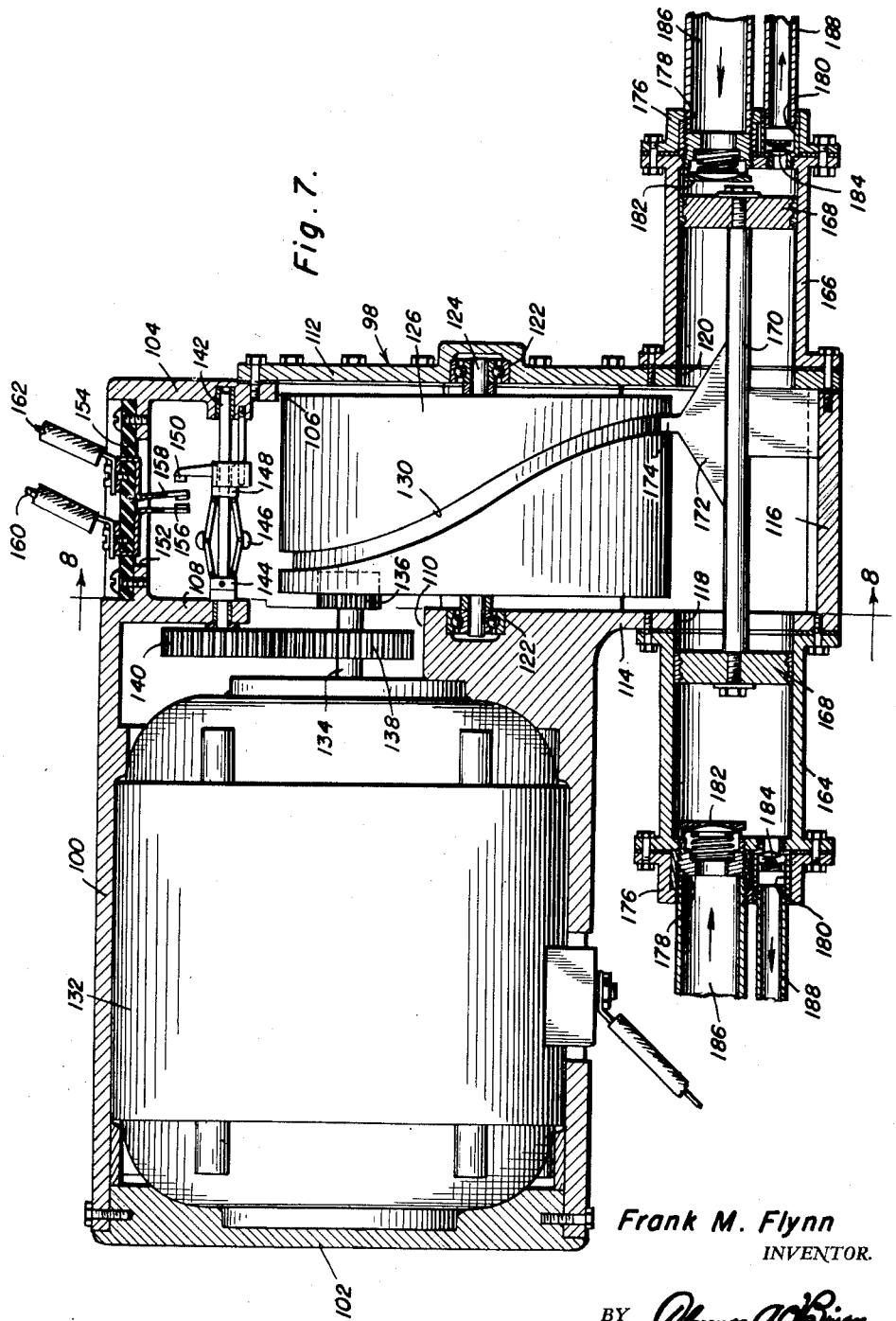

In the drawings:

Figure 1 is a perspective view of an air heating furnace embodying the features of this invention, Figure 2 is a longitudinal sectional view taken substantially along the line 2—2 of Figure 1, Figure 3 is a horizontal sectional view taken substantially along the line 3—3 of Figure 2, Figure 4 is a vertical sectional view taken substantially along the line 4—4 of Figure 3, Figure 5 is an enlarged sectional view through the gas heating unit, Figure 6 is a transverse sectional view taken substantially along the line 6—6 of Figure 5, Figure 7 is an enlarged sectional view through the compressor and drive mechanism therefor, Figure 8 is a transverse sectional view taken substantially along the line 8—8 of Figure 7, Figure 9 is an enlarged sectional view taken substantially along the line 9—9 of Figure 3, and Figure 10 is a wiring diagram illustrating the electrical controls embodied in this invention.

Referring to the drawings in detail, a heating furnace designated generally 10 comprises an outer jacket 12 of substantially rectangular form which is provided in one end wall adjacent its bottom with an air inlet opening 14 which is equipped with a conventional air filter 16.

Extending vertically through the casing 12 near the end remote from the air inlet opening 14 is a partition wall 18, and formed in the top of the casing adjacent the wall having the air inlet opening is an air discharge opening 20 over which is supported a conventional air filter 22, and which is connected to any suitable air distributing sytem 24 by means of which the air is conducted through conventional ducts to the area or areas to be heated. The space between the partition wall 18 and the end of the casing 12 containing the air inlet opening 14 defines an air heating chamber 26, the walls of which are equipped with any suitable thermal insulating material 28. The partition wall 18 defines between it and the end wall remote from the air inlet opening 14 a chamber 30 in which the heat generating elements and compressor are housed. The end wall of the casing 12 remote from that having the air inlet opening 14 is provided with an access opening 32 which is closed by a door 34 of any suitable form which is so designed as to give access to the chamber 30.

Extending horizontally between the side walls of the portion of the casing 12 defining the chamber 26 are baffle plates 36. These baffle plates are of less length than the interior of the chamber, and alternate plates are fixed to opposite end walls of the chamber to form a tortuous passage therethrough as will be readily understood upon reference to Figure 2. Each baffle plate 36 comprises upper and lower plates 38 and 40 respectively which are provided with mating grooves 42 of substantially serpentine form, as illustrated in Figure 3, for the reception of the heated gas conveying tube to be more fully hereinafter described. Extending above and below the baffles 36 between the legs of each bend of the serpentine grooves are heat radiating fins 44. Extending through the passages formed by the mating grooves 42 is a heat conveying tube 46 which is bent to conform to the serpentine shape of the passages, and to form curve connecting lengths 48 by which communication is established between the tubing within the baffles 36. The ends of the tubing 46 are equipped with suitable couplings 50 and 52 for connecting the tubing to the pieces of equipment to be more fully hereinafter described.

Contained within the lower part of the chamber 30 is a gas heating unit designated generally 54. This unit 54 is best illustrated in Figure 5 and comprises a tubular jacket 56, opposite ends of which are equipped with dome-shaped end closures 58, which are provided with aligned openings 60 which align axially with the longitudinal axis of the jacket 56. A helical tube of heat conducting material 62 encircles the jacket 56, and one end 64 of the tube 62 is brazed, welded or otherwise joined to an end closure 58 to form a gas-tight juncture therewith and establish communication through an opening 60 between the tube 62 and the interior of the jacket 56. A discharge tube 66 is welded or otherwise fixed to the opposite dome-shaped end closure 58 in surrounding relation with the opening 60 therein, as will be readily understood upon reference to Figure 5. The end of the tube 62 remote from the end 64 is internally screw-threaded as at 68 for the reception of a conventional expansion valve 70 to which one end of the tube 46 is coupled through the medium of the coupling 52. The jacket 56 and the tube 62 surrounding it are contained within a housing 72 by which suitable thermal insulation 74 is held in surrounding relation with the tube 62 and jacket 56.

Supported on suitable spiders 76 which are fixed to opposite dome-shaped end closures 58 in spaced relation to the openings 60 therein is a supporting rod 78 which extends axially of the chamber 56. A helical baffle 80 is supported on the rod 78 and the periphery thereof lies against the inner face of the tubular jacket 56 to form a spiral passage 82 therein. Supported on the helical baffle 80, and lying in close contact therewith is an electrical heating or resistance element 84 of the type known as "Calrod." As illustrated, the electrical resistor or heating element 84 comprises two spaced lengths arranged in spiral formation and joined together at one end of the helical baffle 80, while the opposite ends of the two runs of resistance or heating elements are respectively coupled through the medium of suitable conductors 86 and 88 to binding posts 90 and 92 which extend through the dome-shaped end closure 58 adjacent the discharge tube 66, and are electrically isolated from one another and from the end closure 58. Conductors 94 and 96 lead from the binding posts 90 and 92 respectively and outwardly through the casing 72.

Supported in any suitable manner within the chamber 30 above the heating unit 54 is a compressor designated generally 98 which comprises a cylindrical housing 100, one end of which is closed by an end plate 102. The opposite end of the housing is provided with an end wall 104 having an opening 106 therein. A partition wall 108 extends across the housing 100 in spaced parallel relation to the end wall 104 and is provided with an opening 110 for a purpose to be more fully hereinafter explained. A cover plate 112 is detachably connected to the end wall 104 to close the opening 106 and depending from the underside of the housing 100 in alignment with the partition wall 108 is a wall 114 which is provided at its perimeter with a wall 116 to which the lower end of the cover plate 112 is secured. The wall 114 and the cover plate 112 are formed respectively with aligning openings 118 and 120 with which the pump cylinders to be more fully hereinafter described align. Mounted in suitable anti-friction bearings 122 carried respectively by the wall 108 and the cover plate 112 is a shaft 124 upon which is mounted for rotation therewith a cam wheel 126. This cam wheel is provided adjacent one end with an annular row of internal gear teeth 128, and formed in the periphery of the cam wheel and opening outwardly thereof is an annular cam groove 130. A suitable drive motor 132 is housed within the casing 100 between the end closure 102 and the wall 108, and fixed to the drive shaft 134 of said motor is a drive pinion 136 which has meshing engagement with the teeth 128 so that when the motor is set into operation, the cam wheel 126 will be rotated. Mounted on the drive shaft 134 adjacent the pinion 136 is a spur gear 138 which has meshing engagement with a spur gear 140 which is mounted on and drives a spindle 142 which is journalled in the walls 108 and 104 above the cam wheel 126. Fixed to the spindle 142 for rotation therewith adjacent the wall 108 is a collar 144 to which one set of arms of a conventional centrifugal governor 146 are attached. The opposite set of arms of the governor are connected to a collar 148 which is mounted on the spindle 142 for sliding movement in relation thereto, and carried by the collar 148 is a presser foot 150. Formed in the wall 116 directly above the spindle 142 is an opening 152 which is closed by a plate 154 of a suitable non-conducting material. Extending through the plate 154 are spaced contacts 156 and 158 which as illustrated in Figure 7, are normally out of engagement with one another. The contact 158 however is arranged to be engaged by the presser foot 150 when the speed at which the motor 132 runs exceeds a predetermined value so as to be moved into contact with the contact 156 to close an electrical circuit. The contacts 156 and 158 are coupled through suitable conductors 160 and 162 respectively to the control mechanism to be more fully hereinafter described.

Bolted or otherwise fixed to the wall 114 is a pump cylinder 164, and a similar cylinder 166 is bolted to the cover plate 112. These cylinders align axially with the openings 118 and 120, and mounted for sliding movement within the cylinders are suitable pistons 168 which are coupled together by a common piston rod 170. Extending radially from the piston rod 170 is an arm 172 which is provided with a cam lug 174 which enters the cam groove 130 so that as the cam wheel 126 rotates, the walls of the groove 130 will cause the piston rod 170 to reciprocate and drive the pistons 168 within their respective cylinders. The ends of the cylinders 164 and 166 remote from the cam wheel 126 are closed by suitable heads 176 which are equipped respectively with intake ports 178 and discharge ports 180. Suitable intake valves 182 are operably mounted in the intake ports 178, to close the ports when the pistons advance toward the heads 176, and to open the ports when the pistons move in the reverse direction. Suitable discharge valves 184 are fitted in the discharge ports 180 and are adapted to open when the pistons move toward the heads 176 in their respective cylinders, and to close when the pistons move in a reverse direction. The intake ports in the cylinders 164 and 166 are coupled through a suitable manifold 186 to the discharge pipe 66 of the heating unit 54, and the discharge ports 180 are coupled through a suitable manifold 188 to the coupling 50 of the tube 46. With the parts thus coupled, and the coupling 52 connected to the expansion valve 70 of the heating unit 54, the system is filled with an inert gas such as carbon dioxide ($CO_2$) and upon impressing a sufficiently high electrical potential on the resistance or heating units 84 and setting the motor 132 into operation, it will be evident that the gas will be heated and forced by the compressor through the tube 46 and thence back through the pressure reducing or expansion valve 70 back to the heating unit 54.

In the preferred form of the invention, I employ a suitable air circulating fan 191 within the housing 12 adjacent the intake opening 14 so as to create a forced circulation of air through the chamber 26 around the baffles 36, and as this air moves around these baffles, heat will be absorbed from the heated gas passing through tube 46 and conveyed through the distributing unit 24 to the space to be heated.

The device is designed primarily for use in conjunction with a three phase electric power supply system the neutral conductor of which is designated 189 while the other two conductors 190 and 192 are arranged in cooperative relation with the conductor 189. A main electrically actuated control switch designated generally 194 is equipped with a conventional solenoid coil 196 one terminal of which is coupled through the medium of a conductor 198 to the conductor 189, while the opposite terminal of said solenoid is connected through the medium of the conductor 162 to the contact 158 of the governor control switch previously referred to. The contact 156 of the governor control switch above mentioned is coupled through the medium of a conductor 200 to the conductor 190 and a conductor 202 leads from the conductor 190 to the stationary contact 204 of the main control switch 194. The movable contact 206 of the main switch 194 is coupled through the medium of a conductor 208 to a terminal 210 of a conventional power actuated thermally responsive switch 212, the movable contact 214 of which is coupled through the medium of a conductor 216 to one terminal of the motor of fan 191. The switch 212 is preferably located within the casing 12 near the discharge opening 20 so that when the temperature within the casing rises to a predetermined value, the switch 212 will close. The terminal of the motor of fan 191 opposite that which is coupled to the conductor 216 is coupled through the medium of a conductor 218 to the conductor 189 of the power system. Coupled at any convenient point to the pressure pipe 46 is the cylinder 220 of a conventional pressure actuated switch, the movable contact 222 of which is adapted to be moved away from the fixed contact 224 to interrupt the flow of electrical power when the pressure within the pipe 46 falls below a value of eighty pounds per square inch. The movable contact 222 is coupled through the medium of a conductor 226 to the conductor 208 and the fixed contact of the pressure actuated switch is coupled through the medium of a conductor 228 to the movable contact 230 of a thermally actuated switch 232 which is adapted to close when the temperature within the space to be heated falls below a value of seventy-eight degrees Fahrenheit. The stationary contact 234 of the thermally actuated switch 232 is coupled through the medium of a conductor 236 which leads to the terminal of the motor 132 opposite that to which the conductor 160 is coupled. The terminal of the conductor 96 remote from that which is coupled to the resistance or heating coil 84 is coupled to the conductor 228, and the conductor 94 at the opposite terminal of the coil 84 is coupled to the conductor 192. It will thus be seen that when the main switch 194 is closed and the pressure actuated switch 220 is likewise closed, electrical energy will flow from the conductors 190 and 192 through the resistance or heating coil 84, thus heating the contents of the heating unit 54. Assuming that the heating system i. e. the closed circuit defined by the heating unit 54, pump 98 and pipe 46 is filled with an inert gas such as carbon dioxide ($CO_2$), it will be evident that the gas contained within the heating unit 54 will attain a very high temperature, approximating 700° to 900° C. Upon the closing of the thermally actuated switch 232, it will be evident that power will be carried from the conductor 189 through the motor 132, thermally controlled switch 232, conductor 228, pressure actuated switch 220 and conductor 226 back through the main switch 194 to the power conductor 190 and hence the motor 132 will be driven to cause the pump or compressor 98 to compress the heated gas and deliver it into the pipe 46. Should a breakdown occur, the governor 146 will cause the contacts 158 to move into engagement with the contacts 156 and close the circuit from the conductor 189 through the conductor 198, solenoid coil 196 and conductor 162, back through the governor control switch through the conductor 200 to the conductor 190 of the power system. In this way, the movable contact 206 will be moved out of contact with the stationary contact 204 and break the circuit through the resistance or heating coil 84. When the temperature within the casing 12 attains approximately 140° F., the thermally responsive switch 212 closes, thus establishing a flow of electrical energy from the conductor 189 through the conductor 218, motor of the fan 191, conductor 216, switch 212, conductor 208 and thence through the main control switch 194 and conductor 202 back to the conductor 190 of the power system. In this way, the fan of the motor 190 will be set into operation and the heat absorbing and conveying medium will be circulated through the chamber 26 around the baffles 36 to absorb the heat contained in the gas which is conducted through the pipes 46.

From the above, it is evident that a rapid and efficient heating system employing electrical energy as the heat generating medium has been devised which may be utilized in conjunction with any suitable warm air distributing system.

Obviously, if it is so desired, a heat absorbing and conveying medium such as water may be employed with but a slight re-design of the casing 12, and the use of a liquid pump in place of the fan 191 for circulating the heat absorbing and conveying liquid to the heating system.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. The hereindescribed method of heating a heat conveying medium which includes, while maintaining it at a relatively low pressure heating a relatively large volume of compressible gas to a temperature of not less than 700° C., compressing the gas so heated to a relatively high pressure, while maintaining said heated gas at the relatively high pressure absorbing the heat therefrom in a heat conveying medium, in the presence of heat reducing the pressure of the gas from which heat has been absorbed and repeating the cycle.

2. In a heating system a heating chamber containing a relatively large volume of compressible gas, electrical heating means within the heating chamber for heating the gas to at least 700° C., a heat exchange coil, a compressor coupled to the heating chamber and to one end of the coil for compressing the heated gas and delivering it to the heat exchange coil, an expansion valve mounted on the heating chamber and establishing communication between the opposite end of the heat exchange coil and the heating chamber for returning the gas from which heat has been dissipated to the chamber at substantially zero pressure, and means for actuating said heating means when the pressure in said heat exchange coil falls below a predetermined value.

3. In a heating system a heating chamber containing a relatively large volume of compressible gas, electrical heating means within the heating chamber for heating the gas to at least 700° C., a heat exchange coil, a compressor coupled to the heating chamber and to one end of the heat exchange coil for compressing the gas and delivering it to the coil at a pressure of about 80 pounds per square inch, an expansion valve mounted on the heating chamber and establishing communication between the opposite end of the heat exchange coil and the heating chamber for returning the gas from which heat has been dissipated to the chamber at substantially zero pressure, and means for actuating said heating means when the pressure in said heat exchange coil falls below a predetermined value.

4. A closed heating system for a space comprising a first heat exchanger for dissipating heat, a fluid pump having its discharge side communicated with said first heat exchanger, pressure reduction means having its high pressure side communicated with said first heat exchanger, a second heat exchanger for absorbing heat communicated with the low pressure side of said pressure reduction means and the inlet side of said pump, means for heating said second heat exchanger, and pressure-responsive means communicated with said system between the discharge side of said pump and the high pressure side of said pressure reduction means for energizing said heating means when the pressure drops below a predetermined value.

5. A closed heating system for a space comprising a first heat exchanger for dissipating heat, a fluid pump having its discharge side communicated with said first heat exchanger, pressure reduction means having its high pressure side communicated with said first heat exchanger, a second heat exchanger for absorbing heat communicated with the low pressure side of said pressure reduction means and the inlet side of said pump, means for heating said second heat exchanger, and pressure-responsive means communicated with said system between the discharge side of said pump and the high pressure side of said pressure reduction means for energizing said heating means when the pressure drops below a predetermined value, thermal-responsive means disposed in the space to be heated for controlling the actuation of said pump.

6. A closed heating system for a space comprising a first heat exchanger for dissipating heat, a fluid pump having its discharge side communicated with said first heat exchanger, pressure reduction means having its high pressure side communicated with said first heat exchanger, a second heat exchanger for absorbing heat communicated with the low pressure side of said pressure reduction means and the inlet side of said pump, means for heating said second heat exchanger, and pressure-responsive means communicated with said system between the discharge side of said pump and the high pressure side of said pressure reduction means for energizing said heating means when the pressure drops below a predetermined value, thermal-responsive means disposed in the space to be heated, said thermal-responsive means and said pressure-responsive means selectively actuating said pump.

7. The combination of claim 4 wherein said first heat exchanger is disposed in a casing having a discharge aperture, means for circulating heating fluid in said casing and out said aperture, thermal-responsive means disposed adjacent said aperture in the path of flow of said heating fluid for controlling actuation of said circulating means.

FRANK M. FLYNN.

REFERENCES CITED

The following references are of record in the file of this patent:

UNITED STATES PATENTS

| Number | Name | Date |
|---|---|---|
| 1,439,340 | St. Clair | Dec. 19, 1922 |
| 1,671,677 | Keeton | May 29, 1928 |
| 2,100,867 | Olson | Nov. 30, 1937 |
| 2,130,089 | Hull | Sept. 13, 1938 |
| 2,135,742 | Brace et al. | Nov. 8, 1938 |
| 2,218,793 | Horton et al. | Oct. 22, 1940 |
| 2,313,390 | Newton | Mar. 9, 1943 |
| 2,414,339 | Skaggs et al. | Jan. 14, 1947 |